United States Patent
Hugl et al.

(10) Patent No.: US 10,285,068 B2
(45) Date of Patent: May 7, 2019

(54) ENB CONTROLLED UE BASED CONDITIONAL CARRIER SELECTION

(71) Applicant: Nokia Technologies Oy, Espoo (FI)

(72) Inventors: Klaus Hugl, Vienna (AT); Esa T. Tiirola, Kempele (FI); Timo E. Lunttila, Espoo (FI); Kari J. Hooli, Oulu (FI)

(73) Assignee: Nokia Technologies Oy, Espoo (FI)

( * ) Notice: Subject to any disclaimer, the term of this patent is extended or adjusted under 35 U.S.C. 154(b) by 11 days.

(21) Appl. No.: 15/563,775

(22) PCT Filed: Feb. 19, 2016

(86) PCT No.: PCT/IB2016/050912
§ 371 (c)(1),
(2) Date: Oct. 2, 2017

(87) PCT Pub. No.: WO2016/162760
PCT Pub. Date: Oct. 13, 2016

(65) Prior Publication Data
US 2018/0098223 A1     Apr. 5, 2018

Related U.S. Application Data

(60) Provisional application No. 62/144,408, filed on Apr. 8, 2015.

(51) Int. Cl.
*H04W 16/14*     (2009.01)
*H04W 74/08*     (2009.01)
(Continued)

(52) U.S. Cl.
CPC ............... *H04W 16/14* (2013.01); *H04L 5/00* (2013.01); *H04L 5/0098* (2013.01);
(Continued)

(58) Field of Classification Search
CPC ............. H04W 16/14; H04W 72/1268; H04W 74/0808; H04W 5/00; H04W 5/0098;
(Continued)

(56) References Cited

U.S. PATENT DOCUMENTS

| | | | | |
|---|---|---|---|---|
| 2013/0165115 A1* | 6/2013 | Jung | | H04L 5/001 455/434 |
| 2014/0362780 A1* | 12/2014 | Malladi | | H04W 16/14 370/329 |

FOREIGN PATENT DOCUMENTS

EP     2398181 A2     12/2011

OTHER PUBLICATIONS

"Study on Licensed-Assisted Access Using LTE", 3GPP TSG RAN Meeting #65, RP-141646, Agenda Item: 14.1.1, Ericsson, Sep. 9-12, 2014, 8 pages.
(Continued)

*Primary Examiner* — Mewale A Ambaye
(74) *Attorney, Agent, or Firm* — Harrington & Smith

(57) ABSTRACT

In accordance with an example embodiment of the present invention, a method, comprising: receiving an information regarding one or more uplink grants of an assigned component carrier to use to transmit data; determining a set of uplink component carriers of licensed-assisted uplink component carriers that are considered as conditional uplink component carriers to use to transmit data; determining whether the assigned component carrier is available to transmit the data; based on determining that the assigned component carrier is not available to transmit the data, identifying a component carrier of the at least one conditional uplink component carrier of the licensed-assisted uplink component carriers that is available to transmit the
(Continued)

data; and transmitting the data on the identified available component carrier of the licensed-assisted uplink component carriers, is disclosed.

20 Claims, 8 Drawing Sheets

(51) Int. Cl.
H04L 5/00 (2006.01)
H04W 72/12 (2009.01)

(52) U.S. Cl.
CPC ....... *H04W 72/1268* (2013.01); *H04W 74/08* (2013.01); *H04W 74/0808* (2013.01)

(58) Field of Classification Search
CPC ............. H04W 72/14; H04W 72/0446; H04W 74/004; H04W 74/08
See application file for complete search history.

(56) References Cited

OTHER PUBLICATIONS

International Search Report and Written Opinion received for corresponding Patent Cooperation Treaty Application No. PCT/IB2016/050912, dated Jun. 14, 2016, 13 pages.
"Discussion on UL Transmission for LAA", 3GPP TSG RAN WG1 #79, R1-144744, Agenda item: 6.3.2.3, Samsung, Nov. 17-21, 2014, pp. 1-4.
"Evaluation Results for LAA With Fast Carrier Selection", 3GPP TSG RAN WG1 Ad-hoc Meeting, R1-151119, Agenda Item: 2.1, Huawei, Mar. 24-26, 2015, 3 pages.
Extended European Search Report received for corresponding European Patent Application No. 16776187.3, dated Oct. 22, 2018, 9 pages.
"Discussion on Possible Solutions for LAA", 3GPP TSG RAN WG1 Meeting# 79, R1-144940, Agenda Item: 6.3.2.2, CMCC, Nov. 17-21, 2014, pp. 1-6.
"Solutions to DL LAA Hidden Node and Channel Reuse", 3GPP TSG RAN WG1 Meeting# 80, R1-150420, Agenda Item: 7.2.3.3, Institute for Information Industry (III), Feb. 9-13, 2015, pp. 1-6.

* cited by examiner

ENB CONTROLLED UE BASED CONDITIONAL CARRIER SELECTION

RELATED APPLICATION

This application was originally filed as Patent Cooperation Treaty Application No. PCT/IB2016/050912 filed Feb. 19, 2016 which claims priority benefit to U.S. Provisional Patent Application No. 62/144,408, filed Apr. 8, 2015.

TECHNICAL FIELD

The teachings in accordance with the exemplary embodiments of this invention relate generally to enabling control and implementing conditional carrier selection for data communications and, more specifically, relate to operations which enable a network device such as a base station to control and implement conditional carrier selection for data communications using licensed-assisted access.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
DTX Discontinuous transmission
eNB LTE Base Station
EPDCCH Enhanced Physical Downlink Control Channel
FDD Frequency Division Duplexing
HARQ Hybrid Automatic Repeat request
ISM band Industrial, Scientific and Medical Band
LAA Licensed-Assisted Access
LBT Listen Before Talk
LTE Long Term Evolution
MCS Modulation and Coding Scheme
MPR Maximum Power Reduction
NACK Negative ACK
PC Power Control
PCell Primary Cell
PDCCH Physical Downlink Control Channel
PHICH Physical HARQ ACK/NACK indicator channel
PRB Physical Resource Block
PUCCH Physical Uplink Control Channel
PUSCH Physical Uplink Shared Channel
RAN Radio Access Network
SCell Secondary Cell
SI Study Item
SINR Signal-to-Interference and Noise Ratio
SR Scheduling Request
SRS Sounding Reference Signal
TD TDD
TDD Time Division Duplexing
TL (Power) Threshold Level
TPC Transmission Power Control
TX Transmission
UCI Uplink Control Information
UE User Equipment
UL Uplink
Wi-Fi A trademark of Wi-Fi alliance LTE offers higher data rates than prior released radio technologies. However, even though spectrum usage efficiency has improved, sometimes this alone cannot enable access data rates that may be required by some devices.

One method to achieve even higher data rates is to increase transmission bandwidths over those supported by a single carrier or channel is to use carrier aggregation (CA), or aggregation. Using carrier aggregation it is possible to utilize more than one carrier and in this way increase the overall transmission bandwidth.

Further, carrier usage for radio access technologies operations, such as LTE, in the unlicensed frequency spectrum can also increase the capacity of the operations. Each access point may support downlink and/or uplink communication for a number of user equipment (UEs) and vice versa.

The exemplary embodiments of the invention as discussed herein work to improve carrier selection for communications in an unlicensed band.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In this invention, there is provided at least a method and apparatus to enable a network device to control and implement conditional and/or opportunistic carrier selection for data communications using Licensed-Assisted Access. Licensed-Assisted Access is 3GPP LTE technology developed for utilizing unlicensed frequency bands, such as ISM bands.

Figure 1:
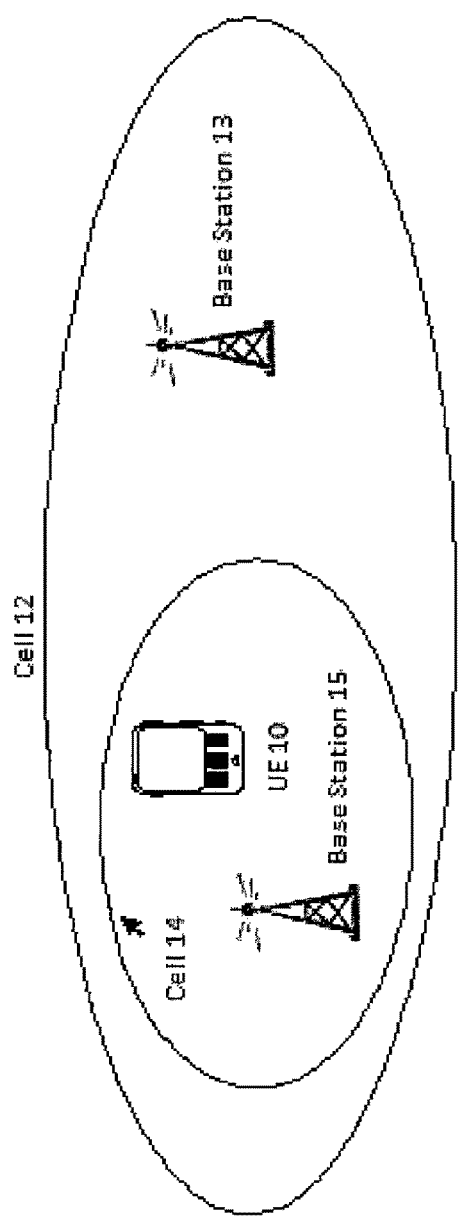
FIG. 1 is a diagram illustrating an example of a User Equipment (UE) in partially overlapping cells.

FIG. 1 shows an example of overall architecture of an E-UTRAN system. The E-UTRAN system includes eNBs, providing an E-UTRAN user plane (PDCP/RLC/MAC/PHY) and control plane (RRC) protocol terminations towards the UE (not shown in FIG. 1). The eNBs are interconnected with each other by means of an X2 interface. The eNBs are also connected by means of a S1 interface to an EPC (Enhanced Packet Core), more specifically to a MME (Mobility Management Entity) by means of a S1 MME interface and to a Serving Gateway (S-GW) by means of a S1 interface. The S1 interface supports a many-to-many relationship between MMEs/S-GW and eNBs.

Referring also to FIG. 1, a UE 10 may be connected to more than one cell at a same time. In this example the UE 10 is connected to a Pcell 12 through a base station 13 (such as an eNB for example) and a Scell 14 through a base station 15 (such as an eNB). Further, the identifications of base stations 13 and 15 as in FIG. 1 can instead represent radio heads served by the same base station. The two cells 12, 14 are, thus, at least partially overlapping. The Pcell 12 may operate on a licensed band and the Scell 14 may operate on a licensed or unlicensed band, such as ISM bands. In certain scenarios, the Scell may operate also on licensed band(s). The Pcell may be either a FDD cell or TDD cell for example. For simplicity, there are just one Pcell and one Scell depicted in the scenario shown in FIG. 1. In other alternate examples any number of S cells operating on licensed and/or unlicensed band(s) may be provided to work together for a suitable Carrier Aggregation (CA). For example when UE uses licensed LTE, LTE and unlicensed band LAA may be activated to perform aggregation over the two radio technologies to reach highest bit rates when seen feasible and UE and network support this. In one type of example embodiment the Pcell and Scell may be co-located.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, including portable units or terminals that incorporate combinations of such functions.

Features as described herein may be used in relation to an LTE-Advanced system. More specifically, features as described herein may be used on LTE operation in an unlicensed spectrum also known as Licensed-Assisted Access (LAA). The LTE LAA operation may be based on LTE Carrier Aggregation (CA). Thus, a CA primary cell (Pcell) may remain on a licensed band while a secondary cell (Scell) may be on an unlicensed spectrum. Licensed-Assisted Carrier Aggregation operation may be used to aggregate a primary cell, which uses a licensed spectrum, with an at least partially overlapping secondary cell, which uses an unlicensed spectrum. In accordance with the exemplary embodiments a licensed-assisted carrier or component carrier can include a radio technology component carrier such as an LTE component carrier as well as a LTE secondary cell on which a listen before talk procedure can be applied. Further, in accordance with the exemplary embodiments a licensed-assisted component carrier can be an uplink or a downlink component carrier. In addition, in accordance with the exemplary embodiments the licensed-assisted component carrier can be used in an unlicensed or a licensed spectrum. In one type of example embodiment the carrier aggregation principle may assume LTE Rel-10/11/12/13 Carrier Aggregation scenario with co-located cells and/or non-collocated cells connected with (close to) ideal backhaul. Alternatively, in another type of example embodiment the carrier aggregation principle may assume Rel-12 Small Cell or Dual Connectivity scenario with non-collocated cells (unlicensed and licensed) and (close to) ideal or non-ideal backhaul between them. In accordance with the exemplary embodiments of the invention the unlicensed spectrum may be conditionally and/or opportunistically assigned for use in carrier selection. The secondary cell may be used for supplemental downlink capacity, or both downlink and uplink capacity.

The exemplary embodiments of the invention relate to LTE-Advanced system, which 3GPP started studying in LTE Rel-13 in October 2014. More specifically, the embodiments focus on Listen-Before-Talk related arrangements for LTE operation on unlicensed spectrum denoted as Licensed-Assisted Access (LAA), considering especially Uplink (UL) operation.

In some regions in the world, unlicensed technologies need to abide to certain regulations, for example, Listen-Before-Talk (LBT) in order to provide fair coexistence between LTE and other technologies such as Wi-Fi as well as between LTE operators.

An objective of the LAA study item is to find a single global solution, which enhances LTE to enable licensed-assisted access to unlicensed spectrum while coexisting with other technologies and fulfilling the regulatory requirements.

In LAA, before being permitted to transmit, a terminal (such as a user device or UE) or an access point (such as eNodeB or base station) may depending on the regulatory requirements need to monitor the given radio frequency for a short period of time to ensure the spectrum is not already occupied by some other transmission. This requirement is referred to as List-before-talk (LBT). The requirements for LBT vary depending on the geographic region: for example, in the US such requirements do not exist, whereas for example in Europe and Japan the network elements operating on unlicensed bands need to comply with LBT requirements. In one example, the LTE LAA may apply a listen before talk (LBT) procedure, such as based on European regulatory rules defined for 5 GHz ISM band. It may also fulfill other regulatory rules applying a LBT procedure, such as regional regulatory rules for example. Moreover, LBT might be needed in order to guarantee co-existence with other unlicensed band usage in order to enable for example fair co-existence with Wi-Fi also operating on the same spectrum.

It is generally well understood that unnecessary transmissions on unlicensed carriers need to be kept at minimum level in order to avoid interfering other devices or access point operating on the same carrier frequency. Furthermore, LBT requirements mean that the eNodeBs and UE operating on unlicensed carrier may need to stop transmission from time to time to monitor whether the channel is available, and if not, suspend transmission for the duration of one or more subframes such as until the channel is sensed again as being available.

Figure 2:
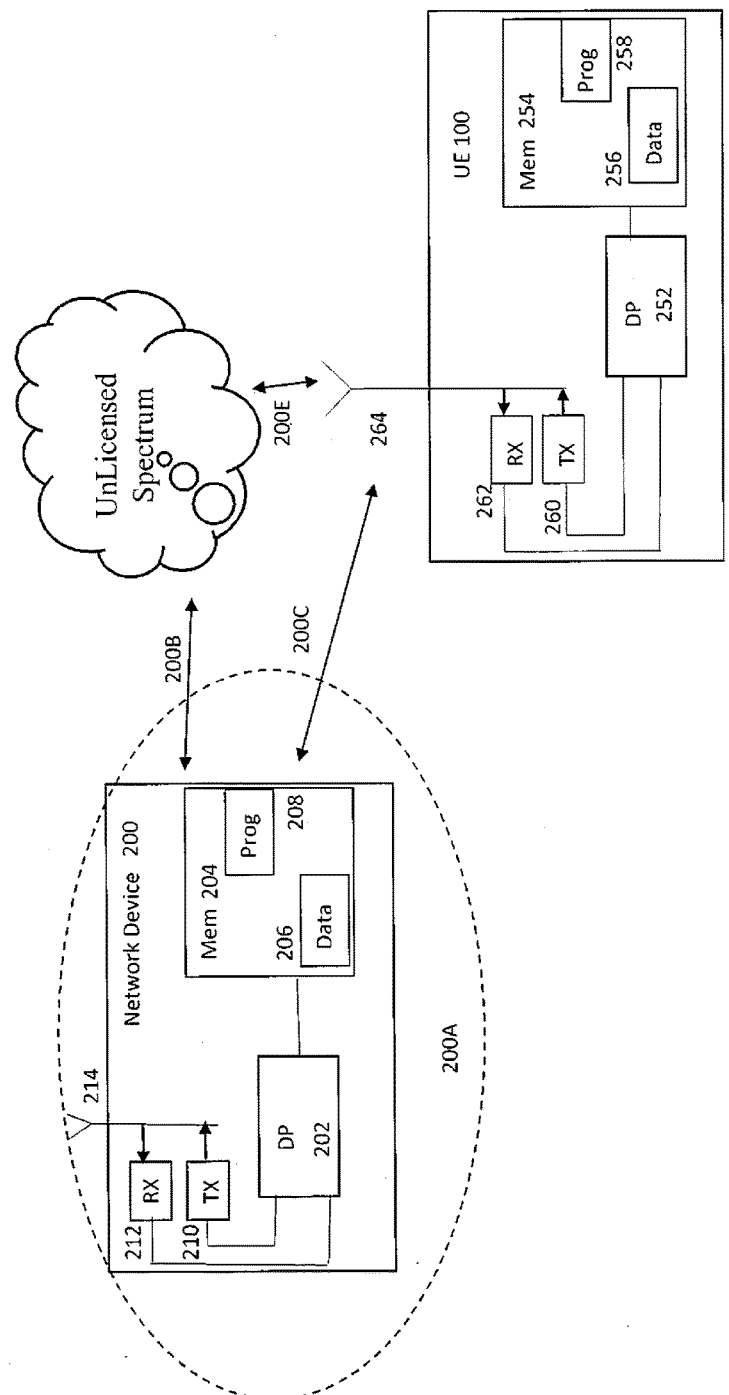
FIG. 2 shows a simplified block diagram of devices configured to perform operations in accordance with the exemplary embodiments of the invention.

Before describing the exemplary embodiments of the invention in further detail reference is now made to FIG. 2. FIG. 2 illustrates a simplified block diagram of devices such as a network device 200 and a user device such as a UE 100, suitable for use in practicing the exemplary embodiments of this invention. In FIG. 2 apparatuses, such as the network device 200 is adapted for communication with other apparatuses having wireless communication capability, such as the UE 100.

The network device 200 includes processing means such as at least one data processor (DP) 202, storing means such as at least one computer-readable memory (MEM) 204 storing data 206 and at least one computer program (PROG) 208 or other set of executable instructions, communicating means such as a transmitter TX 210 and a receiver RX 212 for bidirectional wireless communications with the UE 100 via one or more antennas 214 and via a Licensed and/or Unlicensed spectrum. In addition, it is noted that although FIG. 2 may only illustrate one transmitter TX 210 and one receiver RX 212 in the network device 200 this is non-limiting in accordance with the exemplary embodiments and the network device 200 can be configured to simultaneously support multiple RX and/or TX communications or chains with multiple devices.

It is noted that in FIG. 2 the network device 200 may be incorporated into a network device such as a base station (for example, eNB or eNodeB). Further, the network device 200 and the UE 100 are capable of carrier aggregation.

The UE 100 includes processing means such as at least one data processor (DP) 252, storing means such as at least one computer-readable memory (MEM) 254 storing data 256 and at least one computer program (PROG) 258 or other set of executable instructions, communicating means such as a transmitter TX 260 and a receiver RX 262 for bidirectional wireless communications with the network device 200 via one or more antennas 264 and via Licensed and/or Unlicensed Spectrum. UE 100 capable of carrier aggregation or dual connectivity may have multiple transmitters TX and receivers RX to enable simultaneous communication with the network device 200. In addition, it is noted that although FIG. 2 may only illustrate one transmitter TX 260 and one receiver RX 262 in the UE 100 this is non-limiting in accordance with the exemplary embodiments and the UE 100 can also be configured to simultaneously support multiple RX and/or TX communications or chains with multiple devices. In accordance with the exemplary embodiments the data 206 and/or 256 may include data required to implement a method and operate an apparatus in accordance with the exemplary embodiments of the invention.

At least one of the PROGs 208 in the network device 200 is assumed to include a set of program instructions that, when executed by the associated DP 202, enable the device to operate in accordance with the exemplary embodiments of this invention, as detailed above. In these regards the exemplary embodiments of this invention may be implemented at least in part by computer software stored on the MEM 204, which is executable by the DP 202 of the network device 200, or by hardware, or by a combination of tangibly stored software and hardware (and tangibly stored firmware). Further, it is noted that the network device 200 can be any device associated with an unlicensed band such as, but not limited to, an access point, a base station, eNodeB, and a server.

Similarly, at least one of the PROGs 258 in the UE 100 is assumed to include a set of program instructions that, when executed by the associated DP 252, enable the device to operate in accordance with the exemplary embodiments of this invention, as detailed herein. In these regards the exemplary embodiments of this invention may be implemented at least in part by computer software stored on the MEM 254, which is executable by the DP 252 of the UE 100, or by hardware, or by a combination of tangibly stored software and hardware (and tangibly stored firmware). Electronic devices implementing these aspects of the invention need not be the entire devices as depicted at FIG. 2 or may be one or more components of same such as the above described tangibly stored software, hardware, firmware and DP, or a system on a chip SOC or an application specific integrated circuit ASIC.

As shown in FIG. 2 communication between the network device 200 and the UE 100 can be made via one or more links 200C. Further, communication between the network device 200 and the UE 100 can be using another network such as the unlicensed spectrum as shown with links 200B and 200E. In addition, the UE 100 may communicate with the network device 200 using at least one of communication paths link 200E and/or 200C. Further, any of these links can be wired and/or wireless links, and any of these links can be backhaul type links. Further, the communication paths link 200E and/or 200B can represent at least in part the unlicensed spectrum. The link 200E and/or 200B may include wireless access point(s) which may facilitate such a use in accordance with the exemplary embodiments of the invention.

In general, the various embodiments of the UE 100 can include, but are not limited to, personal portable digital devices having wireless communication capabilities, including but not limited to cellular telephones, navigation devices, laptop/palmtop/tablet computers, digital cameras and music devices, and Internet appliances.

Various embodiments of the computer readable MEM 204 and 254 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 202 and 252 include but are not limited to general purpose computers, special purpose computers, microprocessors, digital signal processors (DSPs) and multi-core processors.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

The exemplary embodiments of the invention can be utilized in at least LTE-Advanced system Rel-13. In particular, the embodiments of the invention focus on LTE operation in an unlicensed band, for example an LTE-LAA system. It is widely assumed that LTE LAA operation may be based on LTE Carrier Aggregation (CA) so in such a case a CA primary cell (Pcell) could remain on a licensed band while secondary cell (Scell) can be located on unlicensed spectrum.

In the following, we assume that LTE LAA applies a listen before talk (LBT) procedure. Such LBT procedure may be based on European regulatory rules defined for 5 GHz ISM band, and that LTE LBT procedure fulfills the European regulatory rules defined either for frame based equipment or for load based equipment, discussed further in the following paragraphs. The scope of the invention is to reduce average latency of data transmission caused by LBT operation (or some other co-existence mechanism) in the LTE LAA context.

As discussed, when operating on unlicensed carriers, the transmitting equipment (eNodeB or UE) may need to perform LBT/Clear Channel Assessment (CCA) before being permitted to transmit. A negative LBT, that is, observing that the operating channel is occupied according to given criteria, means that the transmission must be suspended at least some time until the channel has been assessed as being not occupied. This has significant impact on especially uplink operation of LTE LAA.

In normal (licensed band) LTE operation, the network/eNodeB is always in charge of scheduling UL transmissions, either dynamically via PDCCH UL grants and/or PHICH, or semi-statically or semi-persistently using for example configuration conveyed via RRC signalling (semi-persistent data, UL control signalling). The UE will need to follow eNodeB's orders directly. In the case of dynamic scheduling of PUSCH, there is a predetermined time offset between the subframe in which the eNodeB transmits (and the UE receives) the UL grant/PHICH, and the subframe in which the UL transmits the PUSCH transport block(s) as instructed by the UL grant (or PHICH indicating UL NACK). In LTE frame structure 1 (namely LTE FDD) the offset is always 4 ms (corresponding to 4 LTE subframes), while in LTE frame structure 2 (TD-LTE) the offset depends on the UL-DL configuration and the index of the subframe, and can be larger than 4 ms too.

A problem arises with LBT/CCA. This is for at least the reason that although the eNodeB schedules the UL transmission via UL grant, it has at the time of the scheduling (that is, when it transmits the UL grant to the UE) no idea on whether the UE is in fact able to transmit the PUSCH transport block(s) as instructed, or not. This is due to the reason that the UE must perform LBT/CCA immediately prior to starting the UL transmission, namely only after it has received the UL grant.

The UE having to omit UL transmission due to negative LBT/CCA complicates LTE LAA UL operation considerably. Firstly, the eNodeB will need to perform blind detection to find out whether the given PUSCH transport block was actually transmitted or not. Even though this so call DTX detection is not a complicated operation for the eNodeB, the eNodeB still does not know whether the PUSCH is missing due to a failed LBT, or for example because the UE missed the transmission of the PDCCH UL grant. Having to drop PUSCH TBs due to LBT will have a direct negative impact on UL data throughput, end user latency, and also DL overhead due to wasted DL resources required for scheduling the UL (namely PDCCH or EPDCCH) and should hence be avoided when possible.

As an alternative to UE omitting UL transmission in the case of negative LBT, UE may wait until the channel is vacant and only then transmit the scheduled UL transmission. Also this alternative complicates considerably LTE LAA UL operation. In addition to the blind detection of PUSCH transmission described above, eNodeB needs also to detect timing of actual PUSCH transmission. Further, in the case that multiple UEs are scheduled in consecutive subframes on the same PRB resources, eNodeB needs also to detect from which UE the received PUSCH transmission originates. In addition to such new mechanisms, also scheduling is complicated as at the time of scheduling of a subframe n eNB does not know whether PUSCH transmissions for previous subframes (for example n−1) will be delayed and still waiting for vacant channel.

Figure 3:
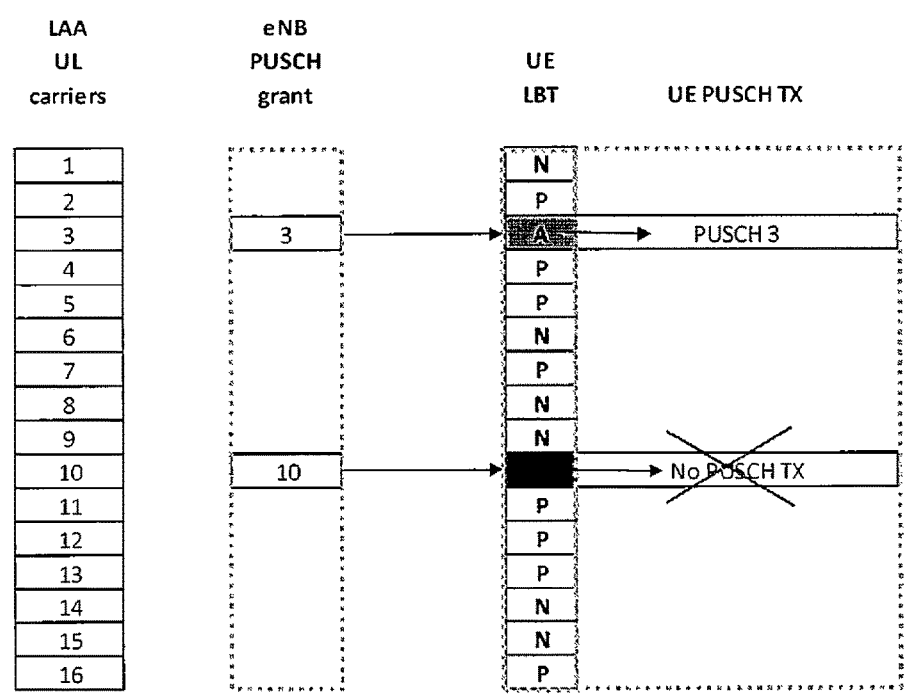
FIG. 3 shows a problem of LBT for PUSCH scheduling.

Let's consider the case, where a UE is configured with, for example, 16 LAA carriers including UL & DL operation. The UE receives UL grants for PUSCH transmission on LAA carrier #3 and LAA carrier #10, as shown in FIG. 3. The UE of course needs to do LBT on these two carriers. For carrier #3, the medium is seen as available (indicated by "A") whereas, LBT on carrier 10 is negative, namely medium is busy (indicated by "B"). As a consequence, taking LBT into account, the UE is able to transmit PUSCH on carrier #3 only and needs to refrain from transmitting PUSCH on carrier #10, as the FIG. 3 indicates.

What is indicated in the FIG. 3 also, is that based on LBT, some of the non-scheduled carriers would have been available (namely would have had positive LBT, indicated in "P") whereas some of the non-scheduled carriers would have shown some negative LBT (indicated by "N").

Conditional scheduling is basically a prior art solution. Here, a UE just omits the transmission in the case when LBT/CCA is negative. Also the alternative where UE, in the case of negative LBT, waits until the channel is vacant and only then transmit the scheduled UL transmission, is known prior art.

In addition, being able to move one HARQ process from one (unlicensed) carrier to another (unlicensed or licensed) carrier has been discussed in 3GPP. But this would mean, that the UE would not transmit on that carrier and would anyhow need to wait for a new UL grant to transmit the data on a different carrier. Still, if a moved HARQ process is again on a different LAA carrier having a negative LBT, this is not helping either as the scheduling eNB will not be able to predict the potential LBT status of a UE some number of milliseconds later on.

The baseline idea is LAA operation that enables UE dynamically choosing the LAA carrier to transmit the scheduled PUSCH in the case when a UE cannot transmit on a given carrier due to negative LBT (namely the scheduled carrier being occupied). The conditional carrier selection is determined based on one or more of: predetermined rules, higher layer configured priority order, or dynamic L1 signaling. Detailed examples of the carrier selection mechanisms are provided below. The underlying assumption is that there are more LAA UL carriers are configured for a UE than are currently scheduled.

Looking also on WiFi as a reference technology using unlicensed band, the number of UL and DL carriers (namely # of 20 MHz blocks) is basically the same. Therefore, it is also envisioned, that a UE supporting LAA will support a large number of LAA carriers in both UL & DL just to be competitive compared to WiFi.

The exemplary embodiments of the invention enable a UE, in case of a negative LBT on the scheduled carrier, to select a different available UL LAA carrier, for example based on higher layer configuration for LAA PUSCH transmission.

Figure 4:
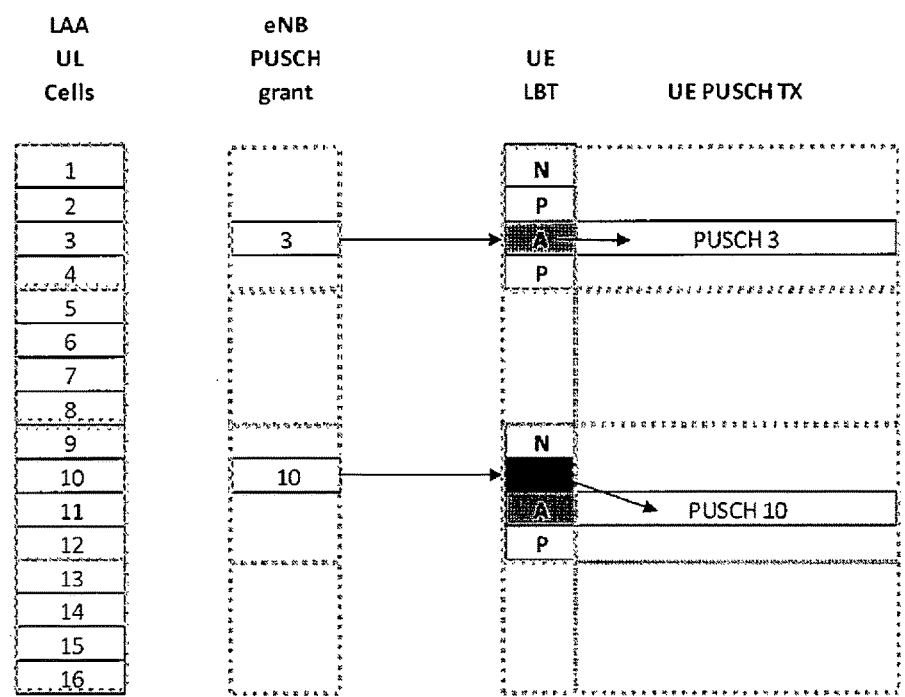
FIG. 4 shows an operation of selecting a different carrier for PUSCH transmission in accordance with the exemplary embodiments of the invention.

An example is shown in FIG. 4: In the example of FIG. 4, the following is assumed here:
1. eNB configures 16 UL carriers
2. eNB configures UE with conditional UL carrier selection The configuration might include the conditional carrier selection to be limited within a carrier group. In the example of FIG. 4, 4 LAA UL carrier groups are assumed (group#1: LAA UL cell #1-4, group#2, LAA UL cell#5-8, group#3: LAA UL cell#9-12, group#4: LAA UL cell#13-16).

The configuration might include a configured priority order for the UE on how to conditionally select an UL carrier. As an alternative, a predetermined priority order might be used by the UE or dynamic L1 signaling as part of the UL grant (in the next step) might be used to indicate to the UE the priority order or rule to apply in the conditional carrier selection.
3. eNB scheduled PUSCH on two cells (as in case of the example of FIG. 1):
   Carrier 3 within 1st group.
   Carrier 10 within 3rd group 4. UE checks by LBT for the groups of the scheduled carriers
   Positive (P)—success, Negative (N)—LBT occupied
5. UE PUSCH carrier selection within LAA UL carrier group
   Carrier 3 available—UE transmits PUSCH on carrier 3 as scheduled
   Within 3rd group, carrier 10 is occupied but carriers 11 and 12 would be available.
   UE chooses another carrier which is available within the group based on a certain rule or based on dynamic signaling (rules discussed separately). Assuming the priority order (through higher layer configuration, predetermined or dynamically signaled) in the example of FIG. 4 would be with increasing cell index, the UE chooses carrier 11 instead of carrier 10 in this case.

By doing so, the probability for a UE to be able to do LAA UL transmission is increased, in case the number of scheduled ULs on LAA is smaller than the number of configured LAA carriers. In the case shown above, the UE would transmit the PUSCH granted for carrier#10 instead on carrier #11.

One might consider, if this would not create some undesired interference—and it may. But this again is under eNB control:

LAA is subject to half-duplex operation, namely the LAA eNB and UE is not able to transmit on some of the LAA carriers whereas receiving on others within the same LAA band (for example 5 GHz). Therefore, just moving the PUSCH to a different carrier at the same time (same subframes) will not create an UL to DL interference issue from LAA point of view; and The PUSCH moved to another LAA carrier might create UL interference for another PUSCH scheduled on that carrier. But this again is based on the configuration for this feature (or the detailed implementation of the configuration) which can be controlled by the eNB as well, including enabling UL MU-MIMO in case two PUSCHs would be colliding.

Basic Operation Principle In Logical Steps (On Top. Of Normal LTE UL CA Operation):

1. eNB configures UE with conditional UL carrier selection (by higher layers)
   The configuration might include the conditional carrier selection to be limited within a carrier group. Please note, that carrier grouping as such is not necessary. As baseline operation, all configured and activated LAA UL carriers can be considered as a single PUSCH selection entity without the need to configure groups (namely single/no group for all LAA UL carriers).
   The configuration might include a configured priority order for the UE on how to conditionally select an UL carrier. As an alternative, a predetermined priority order or rule might be used by the UE or dynamic L1 signaling as part of the UL grant (in the next step) might be used to indicate to the UE the priority order or rule to apply in the conditional carrier selection.
2. eNB sends a UL grant to the UE for specific carrier(s)
3. UE performs LBT on the assigned carrier of a carrier group as well as the other carriers within the related UL carrier group.
   In case the scheduled carrier is available, the UE will of course transmit on that carrier.
   In case the scheduled carrier is not available, the UE will transmit the PUSCH on any available LAA carrier in a certain priority order (through specification/predetermined, higher layer configured or through dynamic L1 signaling).

In terms of HARQ operation two different ways could be thought of. For both cases, the HARQ process logically should stay with the initially scheduled UL carrier (in terms of number of HARQ processes, PHICH, etc.):

1. The carrier selection is only possible for full HARQ process, that is, new data to be transmitted (NDI=1). Then, the selection is HARQ process specific and potential retransmissions would need to be done happening on the same carrier as the selected carrier. Therefore, the HARQ process basically would be fully transferred from one UL carrier to another. The carrier selection gain in this case is limited to the initial transmission of an UL HARQ process. This is clearly in this respect a suboptimal solution.
2. The conditional UL carrier selection is possible for each individual transmission of a single UL HARQ process. In this case, also in case of needed retransmissions of a running UL HARQ process, a specific retransmission can be moved to an alternative selected carrier. Therefore, for the initial and each needed UL retransmission the carrier selection in the UE would be active. This means, that parts of the overall HARQ process (consisting of initial and retransmissions) might be transmitted on different carriers and the UE might return to the scheduled UL carrier in retransmission although some previous (initial or retransmission) had been transmitted on a different (selected) carrier by the UE.

The same transmission parameters (DM-RS, PRB allocation, TBS, MCS, etc.) in terms of PUSCH are used independent of the selected carrier.

4. UE may optionally indicate the UL cell in which current PUSCH was originally assigned. This can be seen as carrier indicator transmitted by UE via UL. Different signaling options can be considered for conveying the carrier indicator:
   PUSCH DMRS resources (orthogonal cover codes, cyclic shifts) can be used for this.
   PUSCH CRC is another option.
   PUCCH payload is the third option.
5. (as alternative to step 4). The UE may optionally indicate whether the current PUSCH is shifted to another carrier due to negative LBT or whether the current PUSCH is transmitted via original assigned UL cell. This could be seen as a way for eNB to handle collisions due to autonomous carrier selection via MU-MIMO framework. For example:
   Original transmissions utilize OCC [1, 1] on PUSCH DMRS resources (or original OCC).
   Shifted transmission utilize OCC [1, −1] on PUSCH DMRS resources (or shifted OCC).
6. eNB receives the PUSCH, this might involve a try to decode the scheduled PUSCH also on another carrier within the carrier group.
   Blind detection of PUSCH (for example DM-RS) by eNB possible.
   The eNB might take the priority order for the conditional UL carriers selection into account.

The eNB might receive from the UE the identification of the used carrier by some 'used carrier' indication, for example on 'PUCCH', as discussed in step 4 and step 5.

Looking at this operation, different ways of operating the eNB control of this carrier selection for UL transmission could be considered:

eNB Control of Feature Operation (Namely Control of UE Behaviour):
  Option #1: Predefined or higher layer configured UE PUSCH selection rules are applied.
    eNB configures UL carrier groups—and the carrier selection according to the selection rule is available by the UE after being configured for it.
      Different carrier group sizes are possible including for some carriers a group size of 1. Thereby, there will be a pool of UL carriers where the UL carrier selection is possible (group size>1), whereas for other scheduled UL carriers negative LBT on that carrier will mean that the PUSCH is not transmitted (namely group size of 1). The carriers with group size of 1, could be used by the eNB as 'non-collision carriers' in order to prevent collisions on them as such.
      Note, that this operation is only needed/feasible for carriers having LBT which is only valid for LAA carriers. Therefore, this operation overall might be restricted to be applicable for LAA carriers only.
    This requires a predefined or preconfigured selection rule (namely order) to be used by the UE.
      The priority order or selection rule might be in increasing/decreasing order of scheduled LAA cell index within the UL cell group (using a cyclic extension within the group).
    Single UL assignment/grant without modification could be used.
  Option #2: On top of the UL group configuration on the order/rule (of Option #1), the eNB dynamically enables the conditional UL carrier selection in the DCI to the UE.
    Single bit in the UL grant indicates if the carrier selection by UE according to the higher layer configured or predetermined priority order/selection rule is applicable or not.
      Possibility for the network to enable this feature dynamically for example based on the number of scheduled UEs/carriers overall.
      This indication could be scheduled UL carrier specific. This means that a UE might be indicated to enable conditional UL carrier selection for some scheduled PUSCH and whereas for other scheduled PUSCH this might not be enabled by the eNB.
      eNB might choose 'enabled' in case of low UL load overall or being able to handle the potential UL MU-MIMO interference in case a different carrier needs to be chosen.
      eNB might choose 'disabled' in case other UEs have been scheduled for UL transmission on the carriers within the UL carrier group and the eNB wants to prevent UL MU-MIMO interference to these transmissions.
    Again—the conditional UL carrier selection rule or priority order needs to be known as in Option #1
  Option #3: eNB signals dynamically the order/rule of carrier selection for the UE.
    This might include the selection rule or order itself—including enabling/disabling the carrier selection for the scheduled PUSCH
    Some more bits in the DCI UL grant are needed (based on the group size). For an UL carrier group size of 2, option 2 and option 3 lead to the same result (and some single bit decision is sufficient)
  Option #4: eNB sends two scheduling UL grants, primary and secondary, to schedule a transport block.
    The secondary grant is linked to first (namely primary) grant—and indicates the alternative carrier(s) directly.
    In case on positive LBT on the carrier indicated by the primary grant, the secondary grant is ignored
    This is the most flexible operation for the eNB to control the transmission, but on the other hand it will increase the DL control load of course.

Predefined or higher layer configured selection rules or priority orders (for Option #1 and #2):

In accordance with an exemplary embodiment of the invention several different priority orders can be considered, including as an example increasing/decreasing order of scheduled LAA cell index within the UL cell group (using a cyclic extension within the group).

Figure 5:
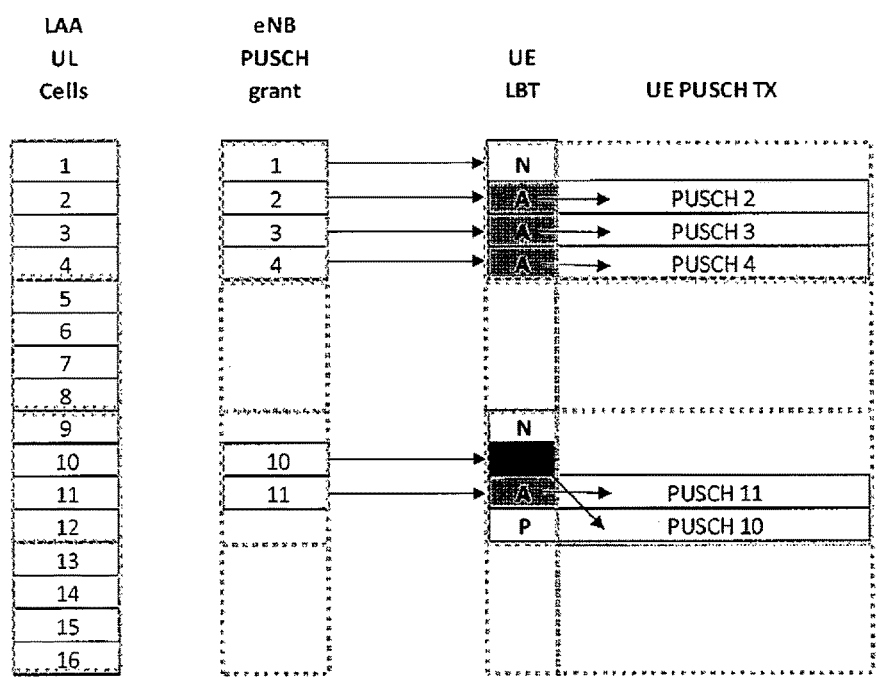
FIG. 5 shows an example of carrier selection based on rules which include increasing an assigned number of a carrier index.

In FIG. 5, we show one example of a case, where the baseline rule is to use the next available UL carrier with increasing cell index as was the case in FIG. 4:

In FIG. 5, the example of carrier grouping with group size of 4 is shown. The scheduled PUSCHs on carriers #2, 3, & 4 within the first UL carrier group can all be transmitted as scheduled—as LBT for these carriers shows the channel as available. For the scheduled UL transmissions within the $3^{rd}$ carrier group the situation is a bit different—carrier#11 shows LBT as positive and hence is available, but the UL scheduled carrier #10 shows LBT as negative. The baseline rule is to use the next available carrier in increasing order within the cell group, which would be carrier #11, but which has an independent UL grant already available. Again, different options can be envisioned here:

A. As there is a grant for carrier #11 already the UE will transmit the PUSCH scheduled on carrier #10 instead on carrier #12 (as shown in the specific example in FIG. 5) independent whether the PUSCH allocations would be colliding within carrier #11 or not (that is, FDM of different PUSCHs scheduled on different carriers not allowed)
  B. The PUSCH scheduled for carrier #10 is moved to carrier #12 only in case the PUSCH allocations in the UL grants for carrier #10 and carrier #11 would be overlapping. Otherwise, the PUSCH scheduled for carrier #10 and carrier #11 would be transmitted in an FDM manner, both of them on carrier #11.

Some More Details on the Possible LBT Operation for this Feature:
  1. Assumption 1: As in case of WiFi, LAA has the same RF possibility both in UL & DL—namely a large number of UL carriers is possible and carrier selection can be flexibly done without the need for RF retuning (namely carrier selection is done in baseband)
    This requires a single PA/RF front end for the full 5 GHz band
    UE is able to do LBT instantaneously on all the carriers within a carrier group
    A second LBT step might be needed for the UE depending on the UE implementation, in order to change the baseband signal to be transmitted on a different than the scheduled carrier Step 1: LBT is basically selecting the carrier for transmission based on the availability Step 2: LBT continues on the selected carrier, while the UE is changing the transmission signal in order to be located on the selected carrier before transmission The second step would not be needed, in case the UE is able to do prepare the baseband signals ahead assuming a single RF transmitter or in case different RF transmitters related baseband signals are available in the UE.

2. Assumption 2: UE has less UL LAA carriers than DL LAA carriers (similar to LTE licensed assumptions)

Still: UE would still be able to do LBT measurement for all the carriers within a group But some RF retuning to the selected carrier might be needed based on the LBT→ two step LBT operation will be needed Step 1: LBT is basically selecting the carrier for transmission based on the availability (same as in case #1 above)

Step 2: LBT continues on the selected carrier for the PUSCH, while the UE is changing the transmission signal in order to be located on the selected carrier before transmission by doing RF UL re-tuning and potential creation of the relevant baseband signal. Due to the fact that potential some RF re-tuning will be needed, the duration of LBT step 2 for this assumption might need to be longer than in case 1 above.

The exemplary embodiments of the invention benefit an operator and a user at least for the reasons that the embodiments enable maximizing the probability of being able to transmit PUSCH on an LAA carrier after receiving an UL scheduling grant. Further, although UE has some flexibility in UL carrier selection, the eNB/network is still setting the limits in terms of carrier grouping and depending on the DCI signaling, even full control for the network could be available. It can be seen that this helps the probability, for example in contrast to just moving HARQ processes from one carrier to the other, as long-term LBT knowledge is not available at the eNB (as explained previously).

Figure 6:
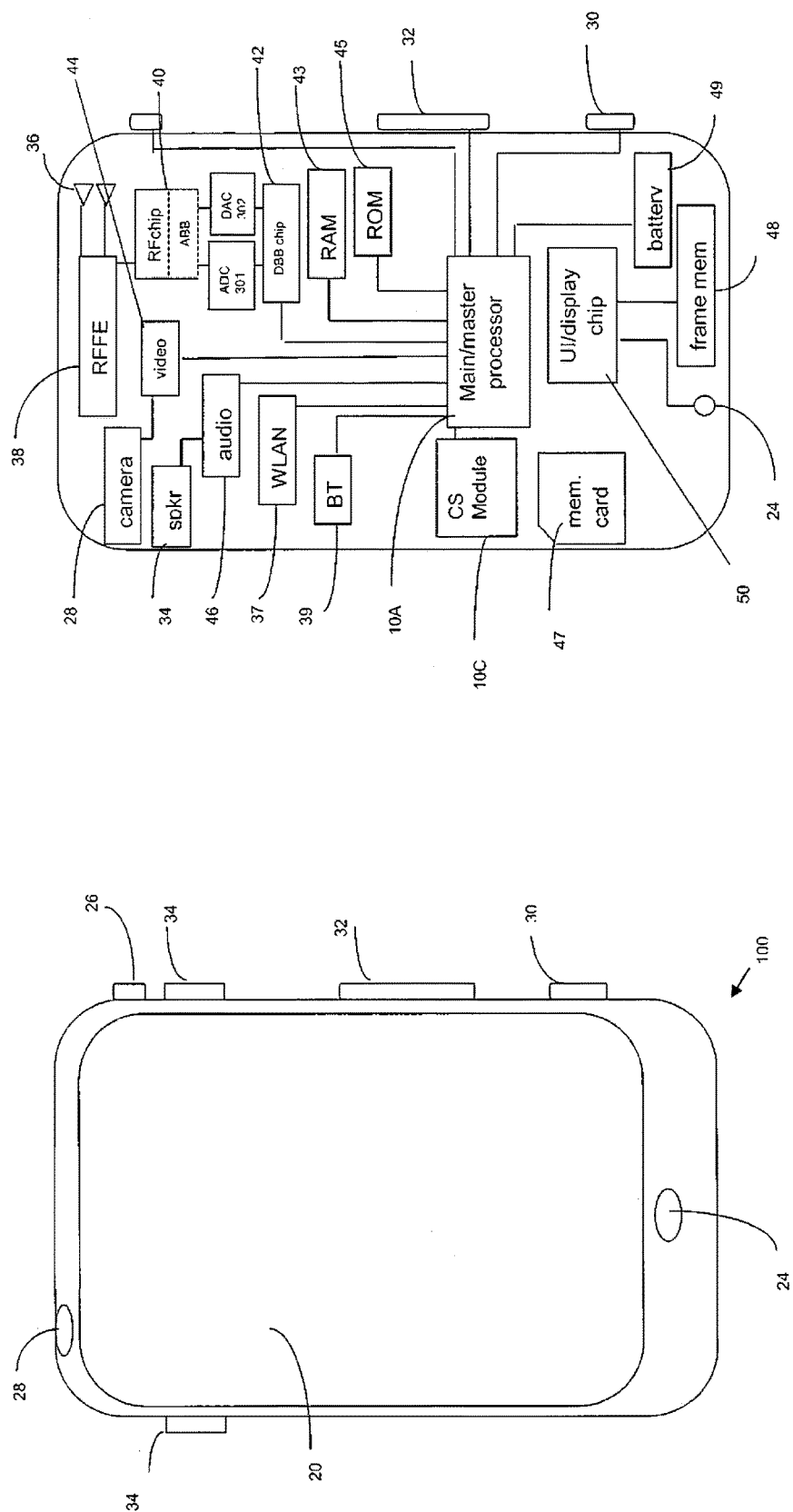
FIG. 6 shows a schematic diagram in plain view (left) and sectional view (right) of a mobile handset capable of performing operations according to an exemplary embodiment of the invention.

FIG. 6 shows a schematic diagram in plain view (left) and sectional view (right) of a mobile handset capable of performing operations according to an exemplary embodiment of the invention. The mobile handset may be a UE 100 as shown in FIG. 2. The UE 100 in both plan view (left) and sectional view (right) which may be configured to perform the operations in accordance with the exemplary embodiments. As shown in FIG. 6, the UE 100 includes a graphical display interface (for example, touchscreen) 20 and a user interface that comprises a microphone 24 and speaker(s) 34 and touch-screen technology at the graphical display interface 20 and/or voice-recognition technology for audio signals received at the microphone 24. A power actuator 26 controls the UE 100 being turned on and/or off by the user. The UE 100 may include a camera(s) module 28, which is shown as forward facing (for example, for video calls) but may alternatively or additionally be rearward facing (for example, for capturing images and video for local storage). The camera(s) 28 may be controlled by a shutter actuator 30 and optionally by a zoom actuator 32, which may alternatively function as a volume adjustment for the speaker(s) 34 when the camera 28 is not in an active mode. Signals to and from the camera(s) 28 pass through an image/video processor (video) 44, which encodes and decodes the image data (for example, image frames). A separate audio processor 46 may also be present to control signals to and from the speakers (spkr) 34 and the microphone 24. The graphical display interface 20 is refreshed from a frame memory (frame mem) 48 as controlled by a user GPU 50, which may process signals to and from the display interface 20. These actuators may also be implemented using touch-screen technology.

Also within the sectional view of FIG. 6 are seen multiple transmit/receive antennas 36 that are typically used for wireless communication (for example, cellular communication). The antennas 36 may be multi-band for use with other radios in the UE. The operable ground plane for the antennas 36 may span the entire space enclosed by the UE housing, though in some embodiments the ground plane may be limited to a smaller area, such as disposed on a printed wiring board on which a RF front-end (RFFE) 38 is formed. The RFFE 38 controls power amplification on the channels being transmitted on and/or across the antennas that transmit simultaneously, where spatial diversity is used. The RFFE 38 outputs to the radio frequency (RF) chip 40, which amplifies, demodulates and down converts the signal for analog baseband (ABB) processing. The analog to digital converter (ADC) 301 converted analog signal to bit-stream, which the digital baseband (DBB) chip 42 detects and finally decoded. Similar processing occurs in reverse for signals generated in the UE 100 and transmitted from the UE.

In addition, the UE 100 may perform carrier selection, including detecting carrier states and selecting carriers as described herein. The carrier operations may be applied to communications involving received and/or transmitted data. Functions of performing the detecting and selecting carriers in accordance with the exemplary embodiments may be enabled by circuitry such as in the CS module 10C of FIG. 6.

The DBB and/or RFIC may also include any of a processor and a memory including computer program code, which controlling transceivers parameters to optimize performance of it. Program code could be storage to memory and it may include algorithms and/or lookup tables (LUT). In addition, it is noted that the placement of any of these components are not limiting and any of the components shown in FIG. 6 may be placed differently and still operate in accordance with the exemplary embodiments. As an example, the ADC and DAC could be on the RFIC side or in the BB side or they even could be separate from both. It is noted that any of the configuration shown in FIG. 6 is not limiting to operations performed in accordance with the exemplary embodiments of the invention.

Certain exemplary embodiments of the UE 100 may also include one or more secondary radios such as a wireless local area network radio (WLAN) 37 and/or a Bluetooth radio (BT) 39, which may incorporate one or more on-chip antennas or be coupled to one or more off-chip antennas. Throughout the UE 100 are various memories 125, such as a random access memory (RAM) 43, a read only memory (ROM) 45, and, in some exemplary embodiments, a removable memory such as the illustrated memory card 47. In some exemplary embodiments, various programs (such as computer program code 315) are stored on the memory card 47. The components within the UE 100 may be powered by a portable power supply such as a battery 49.

It is noted that the communications and/or operations as described in FIGS. 1, 2, 3, 4, 5, 6, and/or 7 are non-limiting to the exemplary embodiments of the invention. The devices and the related operations are merely illustrative of devices and operations for use in practicing the exemplary embodiments of this invention. Further, any of these operations can be performed using any suitable device including a mobile device such as the UE 100 as shown in FIG. 2 or a user equipment as shown in FIG. 6; and/or a network device such as the network device 200 as shown in FIG. 2. Further, the operations as described below may be performed in a different order and/or by different devices than what is described. The exemplary embodiments of the invention may be used in any device which includes a capability to perform carrier aggregation. Such device can include, but are not limited to, network devices such as base stations, radio heads, mobility management entities, and/or gateway devices; and portable devices such as smartphones, tablets, and/or PDAs.

Further, the exemplary embodiments of the invention may be practiced in any device such as a device with an LTE interface.

Figure 7A:
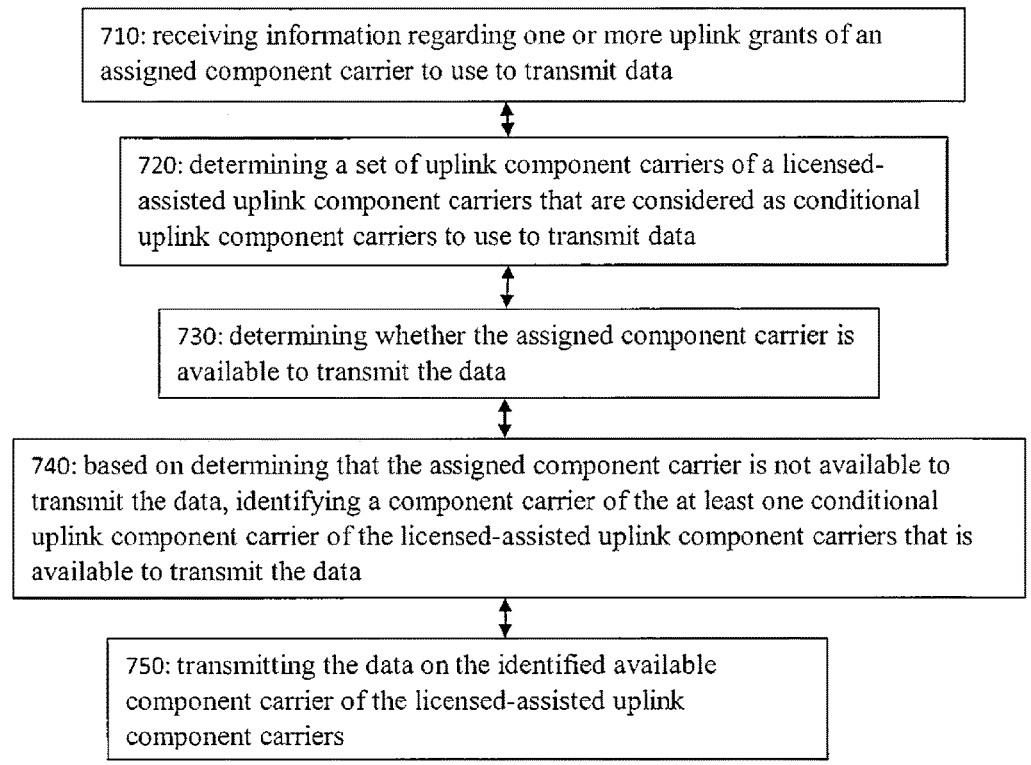
FIGS. 7A and 7B each show a method in accordance with the exemplary embodiments which may be performed by an apparatus.

FIG. 7A illustrates operations which may be performed by a network device such as, but not limited to, a mobile device (for example, the UE 100 as in FIG. 2). As shown in step 710 of FIG. 7A, there is receiving information regarding one or more uplink grants of an assigned component carrier to use to transmit data. As shown in step 720 of FIG. 7A, there is determining a set of uplink component carriers of licensed-assisted uplink component carriers that are considered as conditional uplink component carriers to use to transmit data. As shown in step 730 of FIG. 7A there is determining whether the assigned component carrier is available to transmit the data. As shown in step 740 of FIG. 7A there is based on determining that the assigned component carrier is not available to transmit the data, identifying a component carrier of the at least one conditional uplink component carrier of the licensed-assisted uplink component carriers that is available to transmit the data. Then as shown in step 750 of FIG. 7A there is transmitting the data on the identified available component carrier of the licensed-assisted uplink component carriers.

In accordance with the exemplary embodiments as described in the paragraph above, the determining a set of uplink carriers that are considered as conditional uplink component carriers is at least in part based on a configured one of a priority order or predefined rules.

In accordance with the exemplary embodiments as described in the paragraphs above, the one of the priority order or predefined rules are based on one of one or more component carriers of the licensed-assisted uplink component carriers and a cell group of component carriers of the licensed-assisted uplink component carriers.

In accordance with the exemplary embodiments as described in the paragraphs above, for a case that the one of the priority order or predefined rules are based on a cell group of component carriers, the identifying the component carrier of the more than one component carriers of the licensed-assisted uplink component carriers is using an order of component carriers in the cell group of component carriers.

In accordance with the exemplary embodiments as described in the paragraphs above, the determining the set of uplink component carriers that are considered as conditional uplink component carriers is based on information received with one or more uplink grants for an assigned component carrier to use to transmit data.

In accordance with the exemplary embodiments as described in the paragraphs above, the determining the set of uplink component carriers that are considered as conditional uplink component carriers is using information received through at least one of higher layer signaling, predetermined physical layer signaling, and dynamic physical layer signaling.

In accordance with the exemplary embodiments as described in the paragraphs above, there is transmitting with the data, at least one of an indication of the assigned component carrier and whether the data was transmitted on the assigned component carrier or was shifted to another component carrier.

In accordance with the exemplary embodiments as described in the paragraphs above, the indication is using at least one of orthogonal cover codes and/or cyclic shifts, a cyclic redundancy check, and a payload of a data packet.

In accordance with the exemplary embodiments as described in the paragraphs above, the information of an uplink grant uses at least one component carrier selection indication comprising a single bit to one of enable or disable at the user equipment selecting a component carrier of the licensed-assisted uplink component carriers that is available to transmit the data.

In accordance with the exemplary embodiments as described in the paragraphs above, there is receiving an alternative uplink grant to be used in case the uplink grant of the assigned component carrier is not available to transmit the data.

In accordance with the exemplary embodiments as described in the paragraphs above, the predefined rules are preconfigured at the apparatus by a network device.

In accordance with the exemplary embodiments as described in the paragraphs above, the data transmission comprises a physical uplink shared channel transmission.

In accordance with the exemplary embodiments as described in the paragraphs above, the identifying the component carrier of the at least one component carrier of the licensed-assisted uplink component carriers that is available to transmit the data comprises identifying a conditional uplink component carrier that exhibits a positive listen before talk indication that the component carrier is available.

In accordance with the exemplary embodiments as described in the paragraphs above, the configuration is received through at least one of: higher layer signaling, predetermined physical layer signaling, and dynamic physical layer signaling.

In the exemplary aspect of the invention according to the paragraphs above, wherein the means for determining, identifying and transmitting comprises a non-transitory computer readable medium [MEM 204 and/or 254] encoded with a computer program [PROG 208 and/or 258]; and/or [Data 206 and 256] executable by at least one processor [DP 202 and/or 252].

Figure 7B:
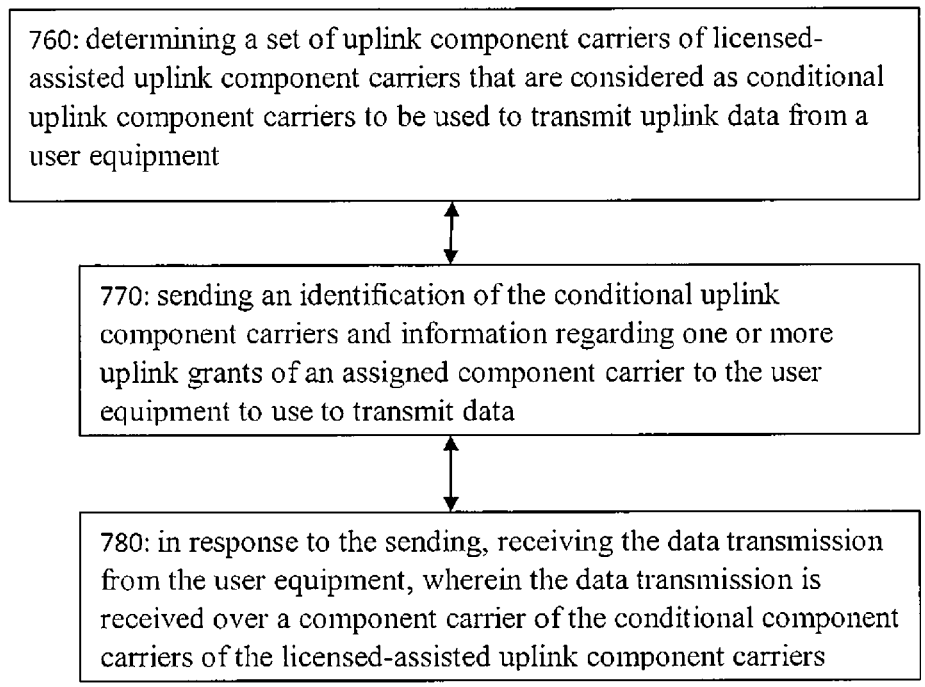

FIG. 7B illustrates operations which may be performed by a network device such as, but not limited to a network device or a base station (such as network device 200 as in FIG. 2), As shown in step 760 of FIG. 7B there is, determining a set of uplink component carriers of a licensed-assisted uplink component carriers that are considered as conditional uplink component carriers to be used to transmit uplink data from a user equipment. As shown in step 770 of FIG. 7B there is sending an identification of the conditional uplink component carriers and information regarding one or more uplink grants of an assigned component carrier to the user equipment to use to transmit data. Then at step 780 of FIG. 7B there is in response to the sending, receiving the data transmission from the user equipment, wherein the data transmission is received over a component carrier of the conditional component carriers of the licensed-assisted uplink component carriers.

In accordance with the exemplary embodiments as described in the paragraph above, the data transmission from the user equipment is received over the component carrier of the licensed-assisted uplink component carriers in response to the assigned component carrier being unavailable.

In accordance with the exemplary embodiments as described in the paragraphs above, there is configuring the one of priority order or predefined rules for the conditional component carriers for the user equipment.

In accordance with the exemplary embodiments as described in the paragraphs above, the predefined rules are based on one of one or more component carriers of the licensed-assisted uplink component carriers and a cell group of component carriers of the licensed-assisted uplink component carriers.

In accordance with the exemplary embodiments as described in the paragraphs above, for a case that the predefined rules are based on cell group of component carriers, a predetermined priority order is used to identify the component carrier of the at least one carrier of the licensed-assisted uplink component carriers that is available to transmit the data.

In accordance with the exemplary embodiments as described in the paragraphs above, the predetermined priority order of the component carriers is indicated in the predefined rules with a cyclic extension of the group.

In accordance with the exemplary embodiments as described in the paragraphs above, the received data comprises at least one of an indication of the assigned component carrier and an indication of whether the data was transmitted on the assigned component carrier or was shifted to another component carrier.

In accordance with the exemplary embodiments as described in the paragraphs above, the indication of the received data is using at least one of orthogonal cover codes and/or cyclic shifts, a cyclic redundancy check, and a payload of a data packet.

In accordance with the exemplary embodiments as described in the paragraphs above, the predefined rules use at least one component carrier selection indication comprising a single bit of downlink control information to one of enable or disable at the user equipment selecting a component carrier of the licensed-assisted uplink component carriers that is available to transmit the data.

In accordance with the exemplary embodiments as described in the paragraphs above, the component carrier selection indication is specific for each component carrier of the at least one component carrier of the licensed-assisted uplink component carriers.

In accordance with the exemplary embodiments as described in the paragraphs above, there is sending an alternative uplink grant to be used in case the uplink grant of the assigned component carrier is not available to transmit the data.

In accordance with the exemplary embodiments as described in the paragraphs above, the data transmission comprises a physical uplink shared channel transmission.

In the exemplary aspect of the invention according to the paragraphs above, wherein the means for determining, sending, and receiving comprises a non-transitory computer readable medium [MEM 204 and/or 254] encoded with a computer program [PROG 208 and/or 258]; and/or [Data 206 and/or 256] executable by at least one processor [DP 202 and/or 252].

The apparatus may be, include or be associated with at least one software application, module, unit or entity configured as arithmetic operation, or as a computer program or portions thereof (including an added or updated software routine), executed by at least one operation processor, unit or module. Computer programs, also called program products or simply programs, including software routines, applets and/or macros, may be stored in any apparatus-readable data storage medium. A computer program product may comprise one or more computer-executable components which, when the program is run, are configured to carry out embodiments described above by means of FIGS. 7A and/or 7B. Additionally, software routines may be downloaded into the apparatus.

The apparatus, such as a node or user device, or a corresponding component, may be configured as a computer or a microprocessor, such as single-chip computer element, or as a chipset, including or being coupled to a memory for providing storage capacity used for software or arithmetic operation(s) and at least one operation processor for executing the software or arithmetic operation(s).

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

We claim:

1. An apparatus, comprising:
   at least one processor; and
   at least one non-transitory memory including computer program code, where the at least one non-transitory memory and the computer program code are configured, with the at least one processor, to cause the apparatus at least to:
   receive information regarding one or more uplink grants of an assigned component carrier to use to transmit data; determine a set of uplink component carriers of licensed-assisted uplink component carriers that are considered as conditional uplink component carriers to use to transmit data;
   determine whether the assigned component carrier is available to transmit the data; based on determining that the assigned component carrier is not available to transmit the data, identify a component carrier of the at least one conditional uplink component carrier that is available to transmit the data; and
   transmit the data on the identified available component carrier of the at least one conditional uplink component carrier.

2. The apparatus according to claim 1, wherein the determining the set of uplink component carriers that are considered as conditional uplink component carriers comprises using information received through at least one of higher layer signaling and dynamic physical layer signaling.

3. The apparatus according to claim 2, wherein the information received through at least one of the higher layer signaling and the dynamic physical layer signaling comprises a configured priority order or predefined rules.

4. The apparatus according to claim 3, wherein the priority order or predefined rules are based on one of one or more component carriers of the licensed-assisted uplink component carriers and a cell group of component carriers of the licensed-assisted uplink component carriers.

5. The apparatus of claim 4, wherein for a case that the priority order or predefined rules are based on a cell group of component carriers, the identifying the component carrier of the more than one component carriers the licensed-assisted uplink component carriers comprises using an order of component carriers in the cell group of component carriers.

6. The apparatus according to claim 1, wherein the determining the set of uplink component carriers that are considered as conditional uplink component carriers is based on information received with the one or more uplink grants for the assigned component carrier to use to transmit data.

7. The apparatus according to claim 1, wherein the at least one non-transitory memory including the computer program code is configured with the at least one processor to cause the apparatus to
   transmit with the data, at least one of an indication of the assigned component carrier and whether the data was transmitted on the assigned component carrier or was shifted to another component carrier.

8. The apparatus according to claim 7, wherein the indication is using at least one of orthogonal cover codes or cyclic shifts, a cyclic redundancy check, and a payload of a data packet.

9. The apparatus according to claim 1, wherein the information of an uplink grant uses at least one component carrier selection indication comprising a single bit to one of enable or disable at the user equipment selection of a component carrier of the conditional uplink component carriers that is available to transmit the data.

10. The apparatus according to claim 1, wherein the identifying the component carrier of the at least one conditional uplink component carrier that is available to transmit the data comprises identifying a conditional uplink component carrier that exhibits a positive listen before talk indication.

11. An apparatus, comprising:
    at least one processor; and
    at least one non-transitory memory including computer program code, where the at least one non-transitory memory and the computer program code are configured, with the at least one processor, to cause the apparatus to at least:
    determine a set of uplink component carriers of a licensed-assisted uplink component carriers that are considered as conditional uplink component carriers to be used to transmit uplink data from a user equipment;
    send an identification of the conditional uplink component carriers and information regarding one or more uplink grants of an assigned component carrier to the user equipment to use to transmit data; and
    in response to the sending, receiving the data transmission from the user equipment, wherein the data transmission is received over a component carrier of the conditional uplink component carriers.

12. The apparatus according to claim 11, wherein the data transmission from the user equipment is received over the component carrier of the conditional uplink component carriers in response to the assigned component carrier being unavailable.

13. The apparatus according to claim 11, wherein the at least one non-transitory memory including the computer program code is configured with the at least one processor to cause the apparatus to configure one of priority order or predefined rules for the conditional uplink component carriers for the user equipment.

14. The apparatus according to claim 13, wherein the predefined rules are based on one of the set of uplink component carriers of the licensed-assisted uplink component carriers and a cell group of the set of uplink component carriers of the licensed-assisted up link component carriers.

15. The apparatus according to claim 14, wherein for a case that the predefined rules are based on cell group of component carriers, a predetermined priority order is used to identify the component carrier of the conditional uplink component carriers that is available to transmit the data.

16. The apparatus according to claim 11, wherein the received data comprises at least one of an indication of the assigned component carrier and an indication of whether the data was transmitted on the assigned component carrier or was shifted to another component carrier.

17. The apparatus according to claim 11, wherein the at least one non-transitory memory including the computer program code is configured with the at least one processor to cause the apparatus to
    transmit at least one component carrier selection indication comprising a single bit of downlink control information to enable or disable at the user equipment selection of the component carrier of the conditional uplink component carriers that is available to transmit the data.

18. The apparatus according to claim 17, wherein the component carrier selection indication is specific for each component carrier of the at least one component carrier of the licensed-assisted uplink component carriers.

19. The apparatus according to claim 11, wherein the at least one non-transitory memory including the computer program code is configured with the at least one processor to cause the apparatus to send an alternative uplink grant to be used in case the uplink grant of the assigned component carrier is not available to transmit the data.

20. A method, comprising:
receiving information regarding one or more uplink grants of an assigned component carrier to use to transmit data; determining a set of uplink component carriers of licensed-assisted uplink component carriers that are considered as conditional uplink component carriers to use to transmit data;
determining whether the assigned component carrier is available to transmit the data; based on determining that the assigned component carrier is not available to transmit the data, identifying a component carrier of the at least one conditional uplink component carrier that is available to transmit the data; and
transmitting the data on the identified available component carrier of the at least one conditional uplink component carrier.

* * * * *

UNITED STATES PATENT AND TRADEMARK OFFICE
CERTIFICATE OF CORRECTION

PATENT NO. : 10,285,068 B2
APPLICATION NO. : 15/563775
DATED : May 7, 2019
INVENTOR(S) : Klaus Hugl et al.

Page 1 of 1

It is certified that error appears in the above-identified patent and that said Letters Patent is hereby corrected as shown below:

In the Claims

Column 20, Line 45, "up link" should be deleted and --uplink-- should be inserted.

Signed and Sealed this
Sixteenth Day of July, 2019

Andrei Iancu
*Director of the United States Patent and Trademark Office*